US008116362B2

(12) United States Patent
Jain et al.

(10) Patent No.: US 8,116,362 B2
(45) Date of Patent: Feb. 14, 2012

(54) TRAFFIC SHAPING BETWEEN THE DMT PROCESSOR AND DATA LINK LAYER PROCESSOR OF A LINE-CARD

(75) Inventors: Raj Kumar Jain, Singapore (SG); Hak Keong Sim, Singapore (SG)

(73) Assignee: Lantiq Deutschland GmbH, Neubiberg (DE)

( * ) Notice: Subject to any disclaimer, the term of this patent is extended or adjusted under 35 U.S.C. 154(b) by 915 days.

(21) Appl. No.: 11/344,955

(22) Filed: Feb. 1, 2006

(65) Prior Publication Data

US 2007/0177662 A1 Aug. 2, 2007

(51) Int. Cl.
*H04B 1/38* (2006.01)
*H04L 5/16* (2006.01)
(52) U.S. Cl. ........ 375/222; 375/221; 375/220; 375/260
(58) Field of Classification Search .............. 375/222, 375/221, 224; 370/208, 480, 493
See application file for complete search history.

(56) References Cited

U.S. PATENT DOCUMENTS

| | | | | |
|---|---|---|---|---|
| 6,108,349 | A * | 8/2000 | Melsa et al. | 370/465 |
| 6,775,305 | B1 * | 8/2004 | Delvaux | 370/535 |
| 7,012,922 | B1 * | 3/2006 | Unitt et al. | 370/395.1 |
| 7,035,323 | B1 * | 4/2006 | Arato et al. | 375/222 |
| 7,069,328 | B1 * | 6/2006 | Bell | 709/227 |
| 7,298,691 | B1 * | 11/2007 | Yonge et al. | 370/203 |
| 7,406,028 | B2 * | 7/2008 | Kratochwil et al. | 370/201 |
| 2007/0121639 | A1 * | 5/2007 | Degrande et al. | 370/394 |

OTHER PUBLICATIONS

ITU-T Recommendation G.992.1, Series G: Transmission Systems and Media, Digital Systems and Networks, Digital Transmission Systems-Digital Sections and Digital Line System -Access Networks, Asymmetric Digital Subscriber Line (ADSL) Transceivers, Jun. 1999, pp. Cover-242.

\* cited by examiner

*Primary Examiner* — Khanh C Tran
*Assistant Examiner* — Qutbuddin Ghulamali
(74) *Attorney, Agent, or Firm* — Slater & Matsil, L.L.P.

(57) ABSTRACT

A line card is proposed in which one or more DMT processing modules 1 communicate with a data link layer platform, such as an ATM, POSPHY or Ethernet processor. The data relating to a single symbol is transmitted between the data link layer platform and a given one of DMT processing modules in a plurality of data portions spaced apart in time. The data portions relating to different channels of a given DMT processing module (or to different DMT processing modules) are interleaved in time. Since the data portions of a given symbol are spaced apart in time, the data relating to a single symbol is transmitted over a longer time period than in conventional devices which reduces the effective burstiness of the traffic, and thus reduces the memory requirements of the data link layer platform.

29 Claims, 4 Drawing Sheets

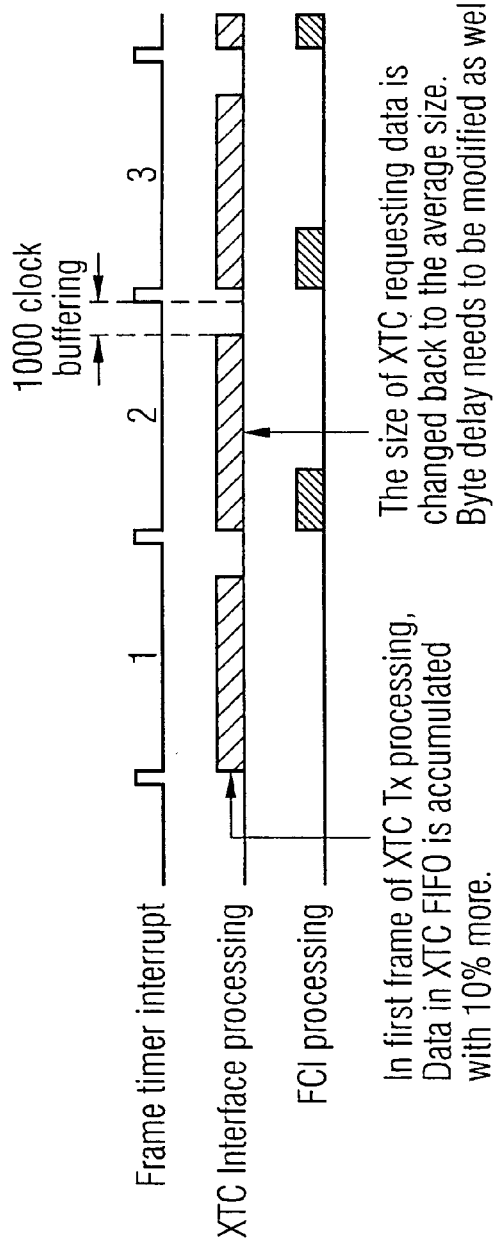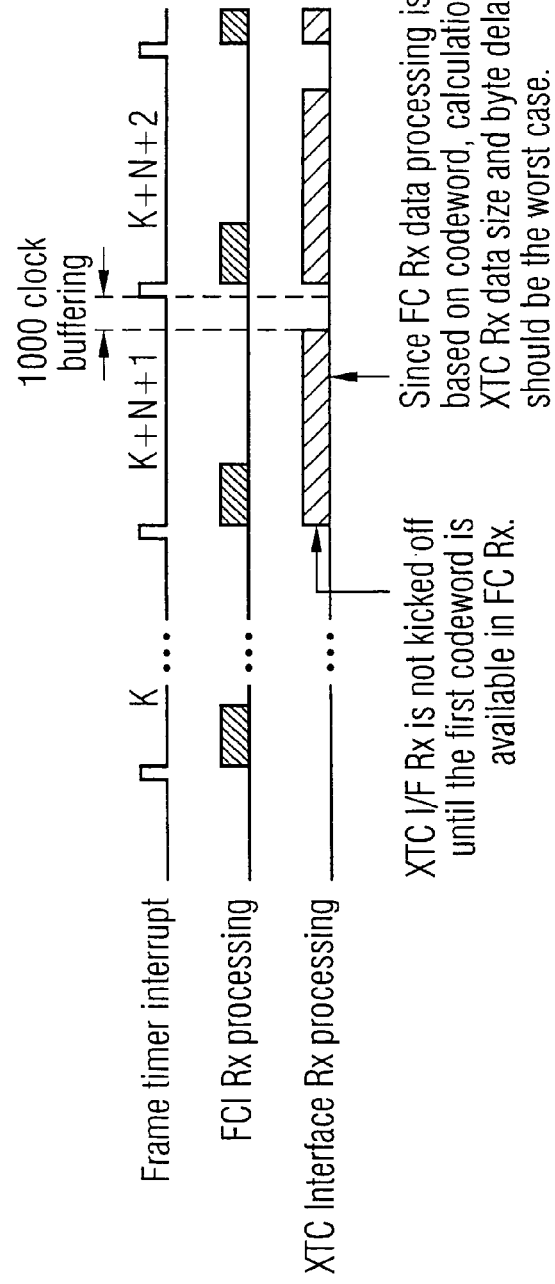

TRAFFIC SHAPING BETWEEN THE DMT PROCESSOR AND DATA LINK LAYER PROCESSOR OF A LINE-CARD

TECHNICAL FIELD

The present invention relates to a line card in which a data link layer processor communicates with one or more DMT processors. In particular the invention relates to ways in which the traffic of this communication process may be shaped.

BACKGROUND

A digital subscriber line (DSL) extends between a telephone service provider's central office and an end user's location. Typically, a plurality of DSLs lead to a single central office (CO). The physical termination at the central office is provided by a unit called a line card, which includes a plurality of processors, each of which is in charge of receiving and/or transmitting data signals along one of more of the lines. The signals may for example be according to a DMT (discrete multi-tone) standard protocol, such as DMT VDSL or DMT ADSL, in which case the processors may be referred to as DMT processing modules. In other DSL applications, a line card may be provided at customer premises equipment (CPE) or at a DLC (digital loop carrier) box where the analogue phone lines from multiple subscribers are combined to form a multiplexed signal, such as for transmission over an optical cable.

The VDSL and ADSL standards both operate based on a number of frequency-divided "channels" defined within the full range of frequencies, which can be transmitted over the DSL. On a given DSL there may thus be multiple channels, each generally associated with a direction along the DSL. Each of the channels is further divided into narrower frequency ranges known as "tones". Data is transmitted on each channel using multiple tones within the channel. The data is coded in a format based on transmitting a series of "symbols" along the channel using substantially all the tones of the channel concurrently. Each symbol itself includes a number of "frames".

The structure of part of the line card is shown schematically in FIG. 1. Within the line card are one or more DMT processing modules 1. Each DMT processing module 1 is associated with one or more corresponding DSL lines, and sends or receives data over a number of channels (each of which is a range of frequencies on one of the DSL lines). In FIG. 1, only a single DMT processing module 1 is shown, but there may in fact by any number. Also, the number of channels for the DMT processing module 1 is indicated as eight (labeled Ch1 to Ch8), but again there may be any number of such channels, possibly with a different number of channels for each DMT processing module 1. The DMT processing modules 1 each communicate with a "data link layer" processor 3 (also referred to as a "layer 2 processor"). The data link layer processor 3 in turn communicates over a "backbone" 9 to another location, typically using a packet- or cell-based communication protocols. Typical data link layer traffic protocols include ATM, POSPHY and Ethernet protocols. Thus, in one form the data layer link processor 3 may be an ATM processor or Ethernet processor. The data link layer processor 3 includes a master 5 and a buffer 7.

Although in FIG. 1, as noted above, only a single DMT processing module 1 is shown, if the data link layer processor 3 is an ATM, POSPHY or Ethernet processing module, there may be a plurality of DMT processing modules 1 connected to different respective ports of the data layer link processor 3, with all of the ports being connected in turn to the backbone 9 via a switching fabric of the data link layer processor 3 controlled by the master 5 and implemented using the buffer 7.

In the downstream (Tx) direction, cells or packets received from the backbone 9 are transmitted via the data link layer processor 3 to one (or possibly more) of the DMT processing modules 1, and the data within the cells or packets is extracted by that DMT processing module 1, converted by that DMT processing module 1 into the DSL communication format (which means encoding it into a symbol), and transmitted over one of that DMT processing module's corresponding DSLs. Conversely, in the upstream (Rx) direction, data received by one of the DMT processing modules 1 in the DSL protocol from along one of its corresponding DSL lines is extracted from the symbol ("decoding" the symbol), and converted by the DMT processing module 1 into packets or cells which the DMT processing module 1 transmits through the data link layer platform 3 to the backbone 9.

Each of the DMT processing modules 1 operates on a symbol-by-symbol basis, which requires that they have at least enough memory to store the whole of a symbol. The processing of this platform is "bursty" in nature since, for example in the Tx direction, it processes the entire symbol at once, and then waits until the symbol is sent over the DSL before processing the next. Conversely, when the DMT processing module 1 receives a symbol over the DSL line, large amount of data is transmitted to the data link platform 3. In a situation in which a single data link layer platform 3 is connected to multiple DMT processing modules 1, such as when the data link layer platform 3 is an ATM or POSPHY system, this traffic results in a particular port of the data link layer platform 3 becoming dominant. This problem is known as "cell burst" and affects the overall quality of service (QOS) of the system.

The traffic on the data link layer is less deterministic. This network traffic, whether it is ATM cells or Ethernet packets, is known to follow a Poisson distribution. This traffic appears "bursty" during a short period, but over a long period would have a constant rate. Note that the burstiness in the data link layer is different from that in the DMT processing modules, in the sense that the bursts (packets/cells) do not occur at regular intervals.

FIG. 2 shows schematically the timing of the communication between the data link platform 3 and one of the DMT processing modules 1 in a conventional device. FIG. 2 shows 8 upstream channels (or alternatively 8 downstream channels). This figure assumes that the DMT processing module 1 is operating 8 upstream channels, referred to as Ch1 to Ch8. The data link platform 3 continually polls the DMT processing module by sending it a polling enquiry signal, to determine whether it has generated any data for transmission to the data link platform 3. The data which the DMT processing module 1 sends to the layer 2 platform tell the layer 2 platform which channel the data came from.

FIG. 2 assumes the "worst case" scenario, that the DMT processing module 1 is receiving symbols over all 8 of the channels it is connected to. Accordingly, in response to each polling signal, the DMT processing module transmits a successive chunk of the data. The DMT processing module 1 transfers all the data received associated with one of the symbols (i.e., the data it has received on a given one of the channels) before moving onto the next channel. That is, starting at the a time $t_0$, the DMT processing module 1 moves through all the eight channels in turn, and for each channel transmits successively all the packets it derives from the respective one of the received symbols. The total process takes a time referred to a "symbol period" (equal to the time between two locations on the time axis labeled to), which is composed of eight shorter periods during which communication in respect of only one of the channels occurs (this period is indicated for each channel by a respective shaded rectangle in FIG. 2). Note that whenever a symbol is received on a given channel, this results in an undesirable burst of data to one port of the data link layer platform 3. If symbols arrive on multiple channels (e.g., on all eight channels as shown in FIG. 2) then the burst is correspondingly greater.

A figure very similar to FIG. 2 can be drawn to represent the downstream traffic from the data link layer platform 3 to the DMT processing module 1. In this case, the data link layer platform 3, upon receiving data to be transmitted to one (or more) of the DSL lines, repeatedly polls the corresponding DMT processing module 1 to ask whether it is ready to receive data. The polling signal contains a different channel ID for different channels. In the case that a symbol is to be transmitted on a given channel, the DMT repeatedly sends a positive response, and, in response to each positive reply, receives a successive chunk of the data until the data link layer platform 3 has transmitted to it all the data associated with a given symbol.

The disadvantages arising from these various forms of burstiness can be at least partially ameliorated by ensuring that the buffer 5 if sufficiently large, but this approach has the disadvantage that the buffer becomes expensive to produce and consumes greater chip area.

Since space in the buffer 5 is limited, it is advantageous in the downstream direction for data to be transferred from the data link layer platform 3 to the DMT processing module(s) 1 as soon as possible. However, once this data has been transferred, the data link layer platform 3 may have no data left, and thus is forced to generate empty "idle cells" when the DMT processing module(s) request further data. These idle cells consume bandwidth between the DMT processing module(s) 1 and the data link layer platform 3 for no purpose, however, so from this point of view it would be advantageous if the data were transmitted as late as possible, to reduce the need for idle cells. In other words, there is an inherent contradiction between the need to transmit data as early as possible, and the need to transmit it as late as possible. Of course, if the data is left too long before being transmitted, then it may simply not be possible to transmit the data when it is required.

A need thus exists for an improved line card and methods for data communication with the line card that address the problems and defects of the prior art as described above. The present invention addresses these needs.

SUMMARY OF THE INVENTION

The present invention aims to provide a new and useful line card, and methods for use by such a line card.

In general terms, preferred embodiments of the present invention propose that in a line card in which one or more DMT processing modules communicate with a data link layer platform, data relating to a single symbol is transmitted between the data link layer platform and a given one of DMT processing modules in a plurality of data portions spaced apart in time.

The data portions for a given symbol are typically spaced apart over one symbol period. Data portions relating to different symbols (e.g., being transmitted to or from different channels of a given DMT processing module) may be interleaved in time.

Since the data portions of a given symbol are spaced apart in time, the data relating to a single symbol is transmitted over a longer time period than in the system described above, which reduces the effective burstiness of the traffic.

Note that the spacing-out of the data portions may be achieved without adversely increasing the memory requirements of the DMT processing modules, since the DMT processing modules each require, in order to generate and/or decode symbols, sufficient memory space to store a complete symbol. Furthermore, the decoding/encoding operation of the DMT processing module need not be affected by whether the data of a given symbol reaches it from the data link layer processor (or is transmitted by it to the data link layer) all at once, or whether as a series of data packets spaced apart in time. In one sense, therefore, the invention may be considered as being based on the realization that the buffer space in the DMT processing modules may be used to reduce the effective burstiness of the traffic, making it possible to reduce the required size of the buffer in the data link layer platform.

The data portions may, for example, each be respective single bytes.

The data portions may correspond to the "chunks" of data described above which are transmitted in response to a single polling enquiry signal.

The spacing out of the data packets may be affected by a timing mechanism within the DMT processing modules. Specifically, in arrangements in which the DMT is polled repeated by a master of the data link layer platform to determine whether the DMT processing module is ready to receive/transmit a data chunk, the DMT processing module may (when it is ready to receive/transmit data) issue a positive response at intervals, interleaved with one or more negative responses. Each positive response causes a data portion to be transmitted, while the negative portions do not cause such a data portion to be transmitted.

In additional preferred embodiments, the timing of the transmission of the data portions may be varied in accordance with at least one property of the symbol to which they relate—such as the size of the data encoded in the symbol. For example, in the case that the DMT processing module controls the timing of the transmission of the data portions in the manner described above using positive and negative responses to polling signals, the DMT processing module may select the timing of the positive and negative responses it transmits based on one or more properties of the corresponding symbol.

For example, in the case that the symbol requires a relatively low amount of data to be transmitted, the DMT processing module may arrange for the data portions to be transmitted relatively later. This alternative method reduces the number of idle bytes, which are transmitted once the whole data of the symbol has been transmitted. In particular, the DMT processing module may arrange for no data portions at all in respect of a given channel to be transmitted during a delay period from the start of the symbol period, and select this delay period to be as long as possible (e.g., subject to a certain safety margin) such that the whole of the data of the symbol can nevertheless be transmitted during the symbol period. The delaying function applies to both the receive and transmit directions.

Note that preferred embodiments of the invention are applicable both to the upstream (Rx) and downstream (Tx) directions. Particularly in the Rx direction, certain embodiments of the invention achieve a very significant reduction in bursting (one may say that the Rx traffic has been subject to "traffic shaping"). In both directions, the buffer memory requirement of the data link layer processor may be reduced as compared to a conventional system.

Specific preferred embodiments of the invention are for a line card having one or more DMT processing modules for generating signals according to a symbol based DSL protocol for transmission on one of more corresponding DSL lines, and a data link layer processor connected to the one or more DMT processing modules for transmitting data to the DMT processing modules, for encoding within the symbols of the DSL protocol, wherein the DMT module or modules receive transmission data from the data link layer processor for encoding, within a single symbol, as a series of data portions temporally spaced apart within the symbol period. Another preferred embodiment further comprises the line card, DMT modules, and data link layer, wherein the DMT module or modules are associated with a respective plurality of transmission channels, and each transmission channel is associates with a respective one or more corresponding DSL lines and including a plurality of tones within a respective range, Further, the DMT processing module or modules receive from the data link layer processor a respective set of said transmission data for each channel associated with that DMG processing module, and the DMT processing module is operative to encode each set of transmission data in a respective symbol for transmission on the respective channel. Further, in this embodiment, each DMT processing module or modules may receive sets of transmission data for different respective ones of the transmissions channels as time interleaved data portions.

Alternatively, preferred embodiments of the invention may be methods carried out by a line card. The line card may be of a form suitable for use at a DSL central office, or for use in any other DSL application such as in CPE or in a DLC box.

BRIEF DESCRIPTION OF THE DRAWINGS

For a more complete understanding of the present invention, and the advantages thereof, reference is now made to the following descriptions taken in conjunction with the accompanying drawing, in which:

FIG. 6, which consists of FIGS. 6(a) and 6(b), depicts another timing diagram indicating timing during a "kick-off" phase of the embodiment of FIG. 3.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
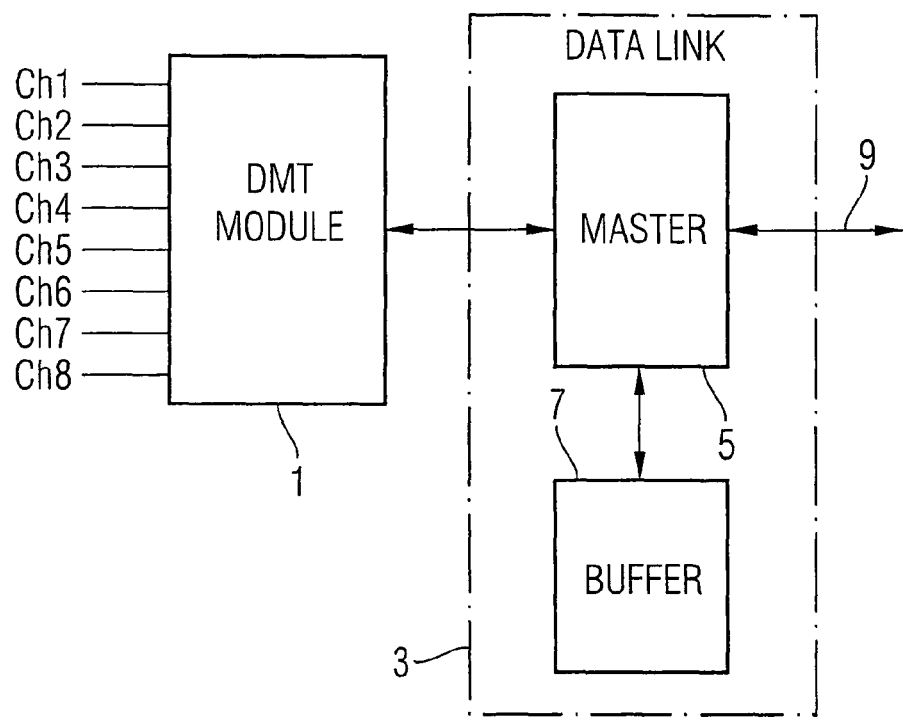
FIG. 1 shows the overall configuration of a known line card in the prior art.

A preferred embodiment of the invention may have the same overall structure as the known device shown in FIG. 1. There is at least one data link layer processor 3, and one or more DMT processing modules 1 connected to the data link layer processor 3. Each DMT processing module 1 is for generating/decoding data transmitted along one or more corresponding DSL lines (not shown) in a symbol-based communication protocol such as the xDSL standard protocol, which may for example be ADSL or VDSL, or any of the variations of those standards in existence now or which may be proposed in the future.

Figure 2:
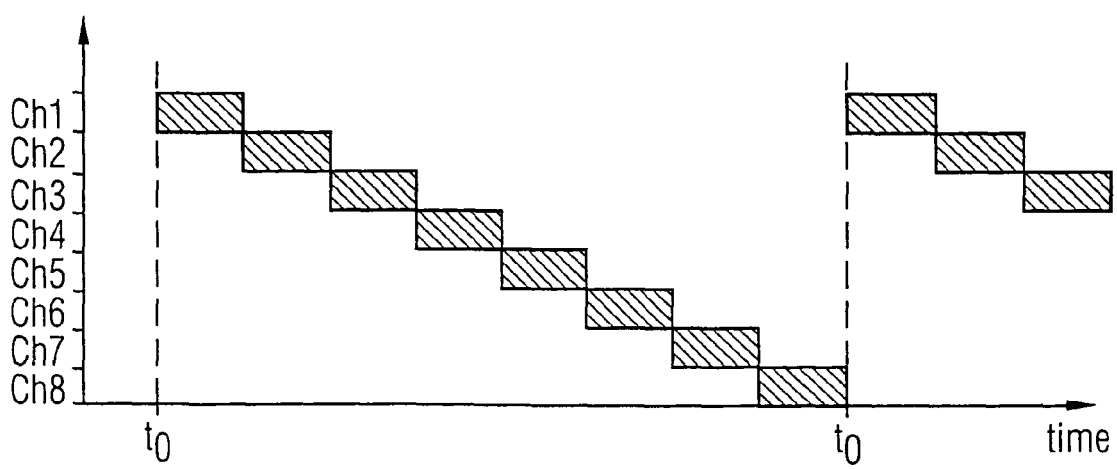
FIG. 2 is a timing diagram showing the timing of data transfer between the units of FIG. 1 in a prior art system.
Figure 3:
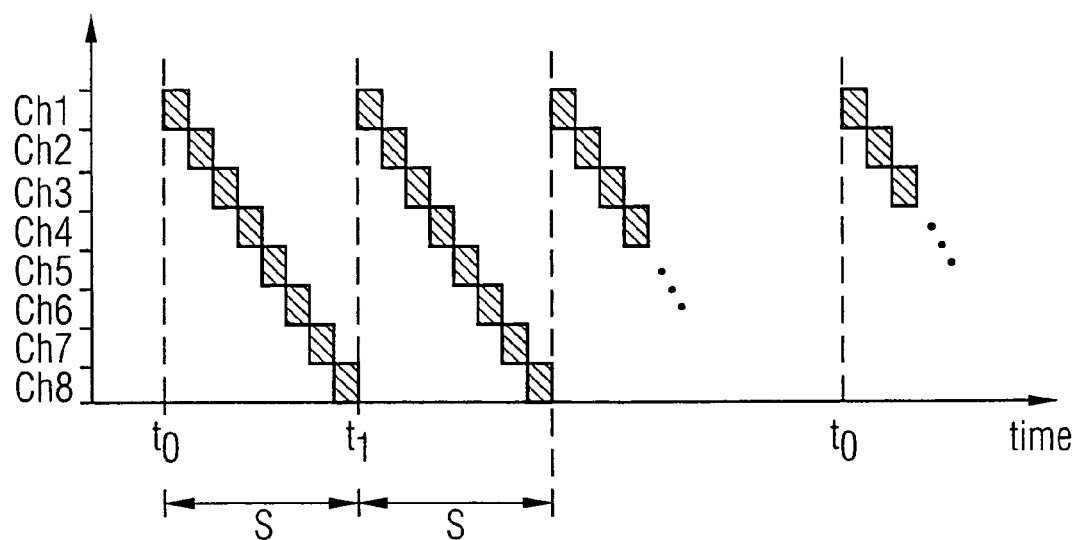
FIG. 3 is a timing diagram showing timing of data transfer within a line card which is an embodiment of the present invention.

In contrast to the prior art timing diagram of FIG. 2, however, the timing of the transfer of data transfer between the data link layer platform 3 in the preferred embodiment may be as shown in FIG. 3. As in FIG. 2, FIG. 3 shows the "worst case" scenario in which data is to be transmitted (or is received) in respect of all the eight channels at once. As indicated schematically in FIG. 2, the transmission of data in respect of the channels is time interleaved. Specifically, one data portion (typically just one byte) is transmitted for each of the eight channels in turn. Thus, the data portions in respect of a given channel are spaced apart, by a pairwise time interval, which is the time taken to transmit data portions in respect of the other seven channels.

The total time taken to transfer a data portion on each of the eight channels will be referred to for convenience herein as a "sweep period" (shown in FIG. 3 as S). If each data portion is a proportion 1/N of the maximum amount of data which can be encoded in a symbol (and transmitted between the DMT processing module 1 and the data link layer processor 1 in one eighth of the symbol period), then up to N sweeps may be needed to transmit a symbol for each of the channels. The "sweep period" is 1/N times the symbol period, or in other words, and N sweeps take up in total the same amount of time as the transmission of the data contained in all eight symbols in FIG. 2.

If each of the eight symbols is of maximal length (i.e., if each requires fully N data portions to transmit it), then data portions will be transmitted in respect of each portion at each sweep. This situation is what is shown in FIG. 3.

It may be that, in particular for certain protocols, the symbols encode an amount of data which can be transmitted between the DMT processing module 1 and the data link layer processor 3 in a period considerably shorter than one eighth of the symbol period. In other words, the number of data portions, which needs to be sent is less than N, say a number of data portions P. In this case, the timing of the data transmission within each symbol period is preferably such as to use the last P sweep periods of the symbol period.

Figure 4:
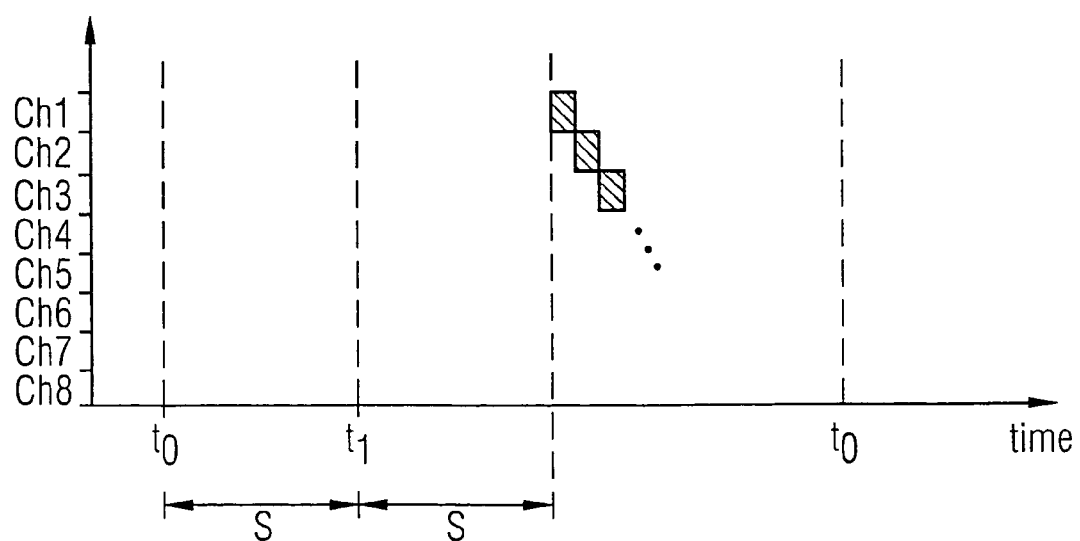
FIG. 4 is a timing diagram showing a modified timing operated by the embodiment of FIG. 3.

FIG. 4, for example, shows a case in which the symbols transmitted on each of the eight channels each contain an amount of data for transmission to the data link layer processor 3 which can be transmitted in only N−2 data portions. In this case, no data is transmitted during the first two sweeps (and accordingly for these two sweeps no data transmission is shown in FIG. 4), but a data portion is transmitted for each of the remaining N−2 sweeps. In effect, within each symbol period, there is no transmission of data between the DMT processing module 1 and the data link layer processor 3 until a certain "delay period" (in this case, two sweeps) has passed.

Figure 5A:
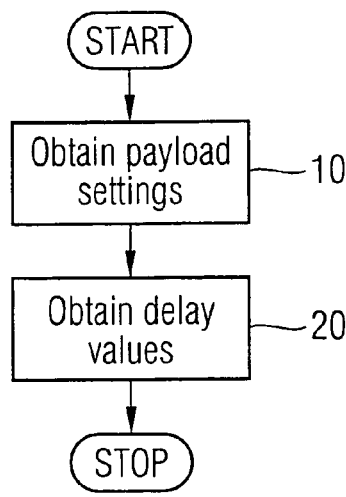
FIG. 5, which consists of FIGS. 5(a) and 5(b), depicts flow diagrams of two respective processes carried out by the DMT processing module of the embodiment of FIG. 3.

FIG. 5(a) shows in flow diagram form a preferred process which may be performed by a DMT processing module 1 of the preferred embodiment when the embodiment is configured to operate according to a given DSL protocol.

In a first step (step 10) the DSL protocol parameters are used to obtain one of more "payload settings". These settings indicate the volume of data, which can be transferred through the system, in accordance with the properties of the embodiment and the DSL protocol standard. Some DSL standards (including VDSL and ADSL) include a number of different "latency paths", which refer to different ways in which data is encoded in the symbols with differing delays. There may be a different payload setting for each of the latency paths. Furthermore, in some cases a first frame (e.g., of a given symbol) may not be processed in the same way as other frames (e.g., if it passes through the embodiment during a "kick-start" process, as described below) and in this case there may be a different payload setting for this first frame.

In a second step (step 20) the DMT processing module 1 determines, based on the calculated payload, an appropriate delay with which to start transmitting/receiving data portions, after the time $t_0$ on FIG. 4.

Figure 5B:
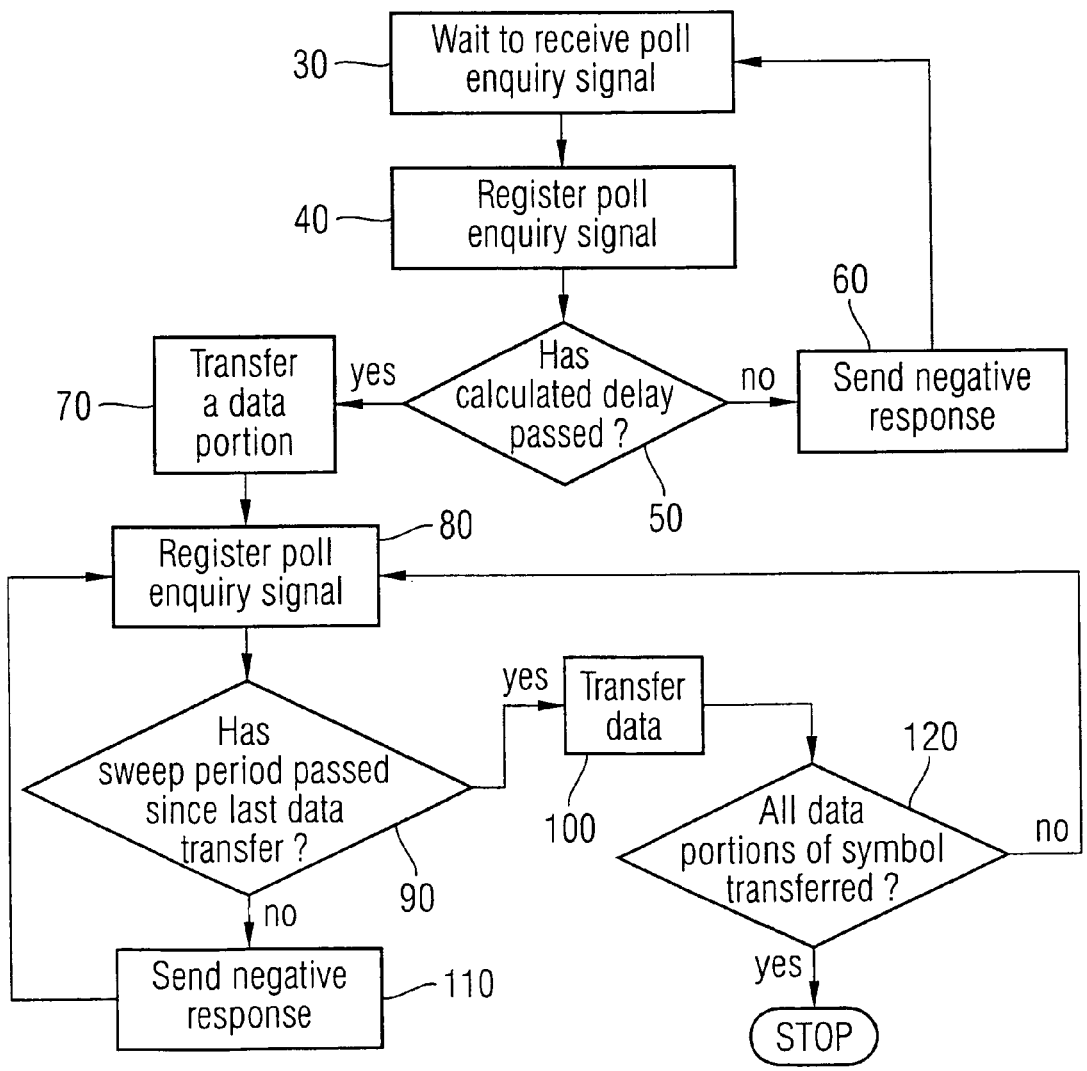

Note that, as an alternative to the process of FIG. 5(*a*), the payload and/or delay values for various protocols (and various values of any variable parameters) can be pre-calculated and stored in memory, and simply retrieved from memory when the embodiment is programmed to operate a certain protocol.

FIG. 5(*b*) shows the steps taken by the DMT processing module 1 to produce this data flow. The process of FIG. 5(*b*) is performed during each symbol period, and is further performed concurrently for each of the channels for which data is to be sent or received.

Suppose that, for a certain receive channel, the DMT processing module 1 has to send to the data link layer 3 the data for a certain symbol (or, in the case of a transmit channel, that it has to receive this data from the data link layer processor 3), and that the number of data portions to be transmitted/received during the next given symbol period is P. Initially the DMT processing module 1 is in a waiting state 30 in which it waits to receive a poll enquiry signal from the data link layer processor 3. The DMT processing module 1 receives and registers this poll enquiry in step 40. The module 1 determines in step 50 whether the calculated delay period has already passed. If not, the module 1 indicates to the data link layer processor 3 that it cannot send/transmit data for that channel (step 60), and then loops back to the state 30. If the determination in step 50 is positive however, the module 1 indicates to the data link layer processor 3 that it can send/transmit data, and a data portion is transferred (step 70).

In step 80 the DMT processing module receives a further poll enquiry signal from the data link layer processor 3. In step 90 it determines whether the sweep time T has passed since a data portion was last sent/received. If the determination in step 90 is positive, the DMT processing module 1 indicates to the data link layer processor 3 that it can send/transmit data, and a data portion is transferred (step 100). The DMT processing module 1 then determines whether all the data portions P for the symbol have now been transferred (step 120). If so, the process terminates. If the determination in step 90 is negative, the DMT processing module 1 indicates to the data link layer processor 3 that it cannot send/transmit data (step 110), and the method loops back to step 80. Similarly, if the determination in step 120 is negative, the process loops back to step 80.

Note that, as compared to the prior art system described above, the programming of the DMT processing module 1 is different in the preferred embodiment, but there is no change in the programming of the data link layer processor 3 as compared to the conventional system.

Some specific examples of the use of the preferred embodiment, in relation to the well-known xDSL standards, including ADSL.dmt, ADSL2, ADSL2+, VDSL1 and VDSL2, are now described. For details of these standards, and of some of the terminology used to describe them in the text below, please refer to the well-known documents which define them, for example see the widely-available ITU standard ITU-T Recommendation G.992.1, "Series G: Transmission Systems and Media, Digital Systems and Networks"; Digital Transmission Systems-Digital sections and digital line system,— Access networks, "Asymmetric digital subscriber line (ADSL) transceivers", published 06/99, the disclosure of which is herein incorporated by reference; and the European Standards Telecommunication Institute (ETSI) document "Transmission and Multiplexing; Access transmission systems on metallic access cables; Very High Speed Digital Subscriber Line (VDSL); Part 2: Transceiver specification, ETSI TS 101 270-2 V1.2.1 (2003-07), the disclosure of which is incorporated herein by reference. Preferably, the preferred embodiment now being discussed is programmable to perform in more than one of these standards (e.g., by loading appropriate firmware into the DMT processing module(s) 1 and the data link processor 3). It is assumed in these examples that the preferred embodiment achieves a throughput of 1 byte every 10 212 MHz clock-cycles.

There are some common guidelines which, in the following, are assumed for all the xDSL modes:

The DMT processing modules have a cell buffer, which is enough for DMT processing.

The processing of the data link processor 3 is independent from that of the DMT processing modules 1.

For each xDSL frame, the data transfer between the DMT processing modules 1 and the data link processor 3 is distributed over the whole frame, as described above. However, a buffering of 1000 clock cycles is performed to make sure enough data can be fetched within one frame.

The Rx transmission is triggered when at least one codeword is available.

FIG. 6 shows the timing diagram for a kicking off procedure used in all the examples. FIG. 6(*a*) shows the timing on the Tx side, while FIG. 6(*b*) shows the timing on the Rx side. FIG. 6(*a*) consists of three sections which, from top to bottom, show: the framer time interrupt signal, which controls the timing of the DMT processor 1; times when transfer of data occurs from the data link processor 3 to the DMT processor 1 (this is shown by shading); times when processing occurs within the DMT processor (this too is shown by shading). FIG. 6(*b*) has the same three sections, but the order of the last two sections is reversed.

On the Tx side, the processing is "kicked off" at the beginning of the first frame, indicated by the framer time interrupt signal. Starting from this time, the DMT processor 1 fetches the data from the data link processor 3 until it has accumulated enough transmitted data in its cell buffer. There may be one byte difference between the PMD layer payload (denoted by $P_{i,PMD}$) and the PMS-TC layer payload (denoted by $P_{i,PMS}$).

$$P_{i,PMS} = P_{i,PMD} \pm 1$$

In the case of the VDSL2 and VDSL1 modes, it is advisable in the first frame to accumulate 10% more payload in the buffer of the DMT processor 1. Because of this, the byte delay configuration can be made smaller than in other processing frames. In the second frame, both data transfer and data processing are kicked off at the same time, and this continues for each subsequent frame. As mentioned above, a 1000 clock cycle is reserved for buffering for all the processing frames. In the calculations below, the calculation of byte delay is based on average payload of the DMT processor 1.

On Rx side, to avoid idle requests and save power consumption, the entire processing operation shown in FIG. 5(*b*)

does not commence until at least one FEC (forward error correction) codeword has been obtained by a codeword buffer in the DMT processor 1. The calculation of byte delay performed below is based on the maximum data rate of Rx per frame. This is due to the fact that the DMT processed data is based on codewords, not bytes.

Note that in the examples below, for dual-bearer channel ("BC") cases, the assumption is made that BC0 is mapped to LP0 and BC1 is mapped to LP1. One skilled in the art will recognize that other cases are easily derived from that. Detailed examples for VDSL1 and VDSL2 mode are shown with tables below.

1. VDSL2 Mode

Table 1 shows one example of a configuration of the embodiment for the VDSL2 mode. Column 1 lists the various configurable parameters of the embodiment, while column 2 gives the values each of these parameters takes in the VDSL2 configuration.

In the VDSL2 mode, the processing rate may be 3125 bytes per symbol, which results in a 100 Mbps VDSL2 line rate. The line rate includes overhead bytes and checkbytes for each codeword. In embodiment, the AT_XTC_SIZE0 and AT_XTC_SIZE1 settings are pure payload data. Using this data, and the VDSL2 standard, one can derive a formula for the calculate payload as follows.

For BC0:

$$AT\_XTC\_SIZE0 = LP0\_DT\_SIZE - Checkbyte\_per\_symbol0 - Overhead\_byte\_per\_symbol0$$

For BC1:

$$AT\_XTC\_SIZE1 = LP1\_DT\_SIZE - Checkbyte\_per\_symbol1 - Overhead\_byte\_per\_symbol1$$

where $$Checkbyte\_per\_symbol0 = \left(\frac{LP0\_DT\_SIZE}{LP0\_CW\_SIZE}\right) * LP0\_CHECKBYTE$$

is the number of checkbytes per DMT symbol for LP0, and $$Overhead\_byte\_per\_symbol0 = LP0\_OHRATE2 * LP0\_Mp * \left(\frac{LP0\_DT\_SIZE}{LP0\_CW\_SIZE}\right)$$

is the number of overhead bytes per DMT symbol for LP0.

$$Checkbyte\_per\_symbol1 = \left(\frac{LP1\_DT\_SIZE}{LP1\_CW\_SIZE}\right) * LP1\_CHECKBYTE$$

is the number of checkbytes per DMT symbol for LP1.

$$Overhead\_byte\_per\_symbol1 = LP1\_OHRATE2 * LP1\_Mp * \left(\frac{LP1\_DT\_SIZE}{LP1\_CW\_SIZE}\right)$$

is the number of overhead bytes per DMT symbol for LP1.

In this example (Table 1), BC0 is mapped to LP0 and BC1 is mapped to LP1. Therefore, based on formulas above

TABLE 1

Configuration for VDSL2 mode.
AT_XTC_SIZE0 = 1832
AT_XTC_SIZE1 = 1053

| Configuration Parameter | Value |
|---|---|
| Mode | VDSL2 |
| Symbol rate | 4K |
| Total Processing rate | 3125 bytes/per symbol (100 Mbps) |
| Byte delay | 7 |
| Latency Path number | 2 |
| Latency Path 0 processing rate | 2015 bytes/per symbol |
| Latency path 1 processing rate | 1158 bytes/per symbol |
| Payload setting BC0 (first frame) | 2015 bytes |
| Payload setting BC1 (first frame) | 1158 bytes |
| Payload setting BC0 | 1832 bytes |
| Payload setting BC1 | 1053 bytes |
| LP0 codeword size | 219 |
| LP0 checkbytes | 6 |
| LP1 codeword size | 192 |
| LP1 checkbytes | 10 |

The cell-buffer is filled with 10% more bytes to adapt the symbol data rate which is non-integer number of bytes in the PMD layer (QT), i.e., $$AT\_XTC\_SIZE0\_A = 1832 * (1+0.1) * 100\% = 2015$$

$$AT\_XTC\_SIZE1\_A = 1053 * (1+0.1) * 100\% = 1158$$

The byte delay is calculated by:

$$LP\_Byte\_Delay = \{(Symbol\_Period/System\_Clock) - 1000\}/Total\_XTC\_Size$$

where $$Total\_XTC\_Size = AT\_XTC\_SIZE0 + AT\_XTC\_SIZE1$$

$$Symbol\_Period = \begin{cases} 250us/System\_Clock & 4K \text{ symbol rate} \\ 125us/System\_Clock & 8K \text{ symbol rate} \end{cases}$$

and the system clock is set to 106 MHz (9.4 ns period).

The Rx side calculation is based on codeword processing. As discussed above, the DMT processing module 1 pushes data out codeword by codeword. So the formulas employed are (assume BC0 mapped to LP0 and BC1 mapped to LP1):

For BC0:

$$AR\_XTC\_SIZE0 = \left\lceil \frac{LP0\_DT\_SIZE}{LP0\_CW} \right\rceil * LP0\_CW$$

For BC1:

$$AR\_XTC\_SIZE1 = \left\lceil \frac{LP1\_DT\_SIZE}{LP1\_CW} \right\rceil * LP1\_CW$$

The byte delay calculation is similar to Tx side, which is:

$$LP\_Byte\_Delay = \{(Symbol\_Period/System\_Clock) - 1000\}/Total\_XTC\_Size$$

where $$Total\_XTC\_Size = AR\_XTC\_SIZE0 + AR\_XTC\_SIZE1$$

$$Symbol\_Period = \begin{cases} 250us/System\_Clock & 4K \text{ symbol rate} \\ 125us/System\_Clock & 8K \text{ symbol rate} \end{cases}$$

The system clock may be 106 MHz (9.4 ns period). In this example, the byte delay settings are*:

$AT\_BC0\_BYTE\_DLY=8$ $AT\_BC1\_BYTE\_DLY=8$ $AR\_BC0\_BYTE\_DLY=8$ $AR\_BC1\_BYTE\_DLY=8$

*: The byte delay for the first Tx frame should be calculated independently.

2. VDSL1 Mode

Table 2 shows an example of a configuration of the embodiment for the VDSL1 mode. In the VDSL1 mode, dummy bytes are added during processing by the DMT processing module 1 to make the payload for each frame into an integer number (as described in the widely-available European Standards Telecommunication Institute (ETSI) document "Transmission and Multiplexing; Access transmission systems on metallic access cables; Very High Speed Digital Subscriber Line (VDSL); Part 2: Transceiver specification, ETSI TS 101 270-2 V1.2.1 (2003-07)). This issue is considered for the preferred embodiment being described as well.

TABLE 2

Configuration for VDSL1 mode.

| Configuration Parameter | Value |
|---|---|
| Mode | VDSL1 |
| Symbol rate | 4K |
| Total Processing rate | 1700 bytes/per symbol (54.4 Mbps) |
| Byte delay (first/second onwards) | 14/16 |
| Latency Path number | 1 |
| Latency Path 0 processing rate | 1700 bytes/per symbol |
| Payload setting BC0 (first frame) | 1762 bytes |
| VOC | 4 bytes |
| EOC | 15 bytes |
| Payload setting BC0 | 1601 bytes |
| LP0 codeword size | 219 |
| LP0 checkbytes | 10 |
| Dz,i | 53 bytes |
| Drs,i | 82 bytes |

From the VDSL1 standard, $$LP0\_DT\_SIZE = \frac{\left\{\frac{(AT\_XTC\_SIZE0 * H + D_{Z,0})/}{H + Over\_Head\_Byte0 + 1}\right\} * N_0 + D_{RS,0}}{K_0}$$

$$LP1\_DT\_SIZE = \frac{\left\{\frac{(AT\_XTC\_SIZE1 * H + D_{Z,1})/}{H + Over\_Head\_Byte1 + 1}\right\} * N_1 + D_{RS,1}}{K_1}$$

where $D_{RS,i}$ is the dummy bytes added for RS encoding.
$D_{Z,i}$ is the number of dummy bytes added for cyclic extension.
H is a sequence of VDSL frames. Normally, it is 138.
Over_Head_Byte is VOC or EOC bytes per VDSL frame.

In the example of Table 2, only one latency path—LP0 and one bear channel—BC0 are enabled. In VDSL1 standard, one latency path just supports one bearer channel. Based on formula above, $AT\_XTC\_SIZE0=1602$ which is the average data bytes for DMT processing.

To make this consistent, accumulate 10% more data is accumulated in the first frame, which can be calculated as:

$AT\_XTC\_SIZE0\_A = AT\_XTC\_SIZE0*(1+0.1)*100\%=1762$

All these values can be seen in Table 2.

For the details of how to calculate dummy bytes—$D_{RS,i}$ and $D_{Z,i}$, please refer to the document: "Transmission and Multiplexing; Access transmission systems on metallic access cables"; Very High Speed Digital Subscriber Line (VDSL); Part 2: Transceiver specification, ETSI TS 101 270-2 V1.2.1 (2003-07), which is herein incorporated by reference.

The byte delay is also calculated by:

$$LP\_Byte\_Delay = \{(Symbol\_Period/System\_Clock) - 1000\}/Total\_XTC\_Size$$

where $$Total\_XTC\_Size = AT\_XTC\_SIZE0 + AT\_XTC\_SIZE1$$

$$Symbol\_Period = \begin{cases} 250us/System\_Clock & 4K \text{ symbol rate} \\ 125us/System\_Clock & 8K \text{ symbol rate} \end{cases}$$

In the above example, the BC1 payload—AT_XTC_SIZE1 is zero.

The Rx side calculation is the same as for the VDSL2 mode. Assuming BC0 mapped to LP0 and BC1 mapped to LP1:

For BC0:

$$AR\_XTC\_SIZE0 = \left\lceil \frac{LP0\_DT\_SIZE}{LP0\_CW} \right\rceil * LP0\_CW$$

For BC1:

$$AR\_XTC\_SIZE1 = \left\lceil \frac{LP1\_DT\_SIZE}{LP1\_CW} \right\rceil * LP1\_CW$$

The byte delay calculation is similar to Tx side, which is:

$$LP\_Byte\_Delay = \{(Symbol\_Period/System\_Clock) - 1000\}/Total\_XTC\_Size$$

where $$Total\_XTC\_Size = AR\_XTC\_SIZE0 + AR\_XTC\_SIZE1$$

$$Symbol\_Period = \begin{cases} 250us/System\_Clock \ 4K \ symbol \ rate \\ 125us/System\_Clock \ 8K \ symbol \ rate \end{cases}$$

The system clock is 106 MHz (9.4 ns period). The reference values for the example above are*:

$$AT\_BC0\_BYTE\_DLY=15$$

$$AR\_BC0\_BYTE\_DLY=15$$

*: The byte delay for the first Tx frame should be calculated independently.

3. ADSL2/ADSL2+Mode

Compared with the VDSL2 and VDSL1 modes, the ADSL2/ADSL2+mode can applied in a simpler way. Since the payload data for each bearer channel is not so large, the payloads could be configured with worst cases on both Tx and Rx sides.

For the LP0 path (assume it is mapped with BC0 only):

$$AT\_XTC\_SIZE0=[LP0\_DT\_SIZE/LP0\_CODEWORD]*LP0\_CODEWORD$$

For the LP1 path (assume it is mapped to BC1 only):

$$AT\_XTC\_SIZE1=[LP1\_DT\_SIZE/LP1\_CODEWORD]*LP1\_CODEWORD$$

A more complex situation is when both bearer channels are mapped to a single latency.

$$AT\_XTC\_SIZE0 = \left\lceil \frac{LP0\_DT\_SIZE}{(LP0\_CW + LP1\_CW)} \right\rceil * (VBC\_SIZE0 + 1)*LP0\_Mp$$

$$AT\_XTC\_SIZE1 = \left\lceil \frac{LP1\_DT\_SIZE}{(LP1\_CW + LP1\_CW)} \right\rceil * (VBC\_SIZE1 * LP1 + 1)\_Mp$$

where VBC_SIZE0 and VBC_SIZE1 are frame payload for each bearer channels.

Byte delay is calculated by:

$$LP\_Byte\_Delay=\{(Symbol\_Period/System\_Clock)-1000\}/Total\_XTC\_Size1$$

where $$Total\_XTC\_Size=AT\_XTC\_SIZE0+AT\_XTC\_SIZE1$$

$$Symbol\_Period=250 \ us/System\_Clock$$

and the system clock is set to 106 MHz (9.4 ns period).

4. ADSL.dmt Mode

ADSL processes data based on frame's payload. Using the same assumption here for two latency case as in ADSL2/2+ mode, i.e. BC0 mapped to LP0 and BC1 mapped to LP1.

Consider about the worst case on Rx side. The conclusions are:

$$AT\_XTC\_SIZE0=VBC0\_PAYLOAD$$

$$AT\_XTC\_SIZE1=VBC1\_PAYLOAD$$

$$AR\_XTC\_SIZE0=VBC0\_PAYLOAD*LP0\_Mp$$

$$AR\_XTC\_SIZE1=VBC1\_PAYLOAD*LP1\_Mp$$

where VBC_SIZE0 and VBC_SIZE1 are frame payload for each bearer channels. LP0_Mp and LP1_Mp are mux frames per codeword for each latency.

Byte delay is calculated by:

$$LP\_Byte\_Delay=\{(Symbol\_Period/System\_Clock)-1000\}/Total\_XTC\_Size$$

where $$Total\_XTC\_Size=AT\_XTC\_SIZE0+AT\_XTC\_SIZE1$$

$$Symbol\_Period=250 \ us/System\_Clock$$

and the system clock is set to 106 MHz (9.4 ns period).

Although only a few preferred embodiments of the invention have been described in detail, it is to be understood that many variations are possible within the scope of the invention as defined by the claims and the specification and examples should be read and understood as not limiting the claimed invention.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. For example the processes described could be implemented in circuit hardware, programmable circuitry such as a processor with firmware, and alternatively as executable software for a general purpose computer. Accordingly, the appended claims are intended to include within their scope such processes, machines, manufacture, compositions of matter, means, methods, or steps.

What is claimed is:

1. A system comprising:
one or more discrete multi-tone (DMT) processing modules for generating signals according to a symbol-based DSL protocol for transmission on one or more corresponding DSL lines; and
a data link layer processor connected to the one or more DMT processing modules for transmitting data to the DMT processing modules;
wherein each of the one or more DMT processing modules is arranged to receive transmission data from the data link layer processor for encoding a single symbol as a series of data portions temporally spaced apart from each other by a time interval within a symbol period, the data portions spaced apart from each other by data portions from a different symbol within the symbol period, wherein data portions of one symbol are interleaved in time with data portions from another symbol over the entire symbol period.

2. The system of claim 1, wherein:
the one or more DMT processing modules are associated with a respective plurality of transmission channels, each transmission channel being associated with a respective one of said one or more corresponding DSL lines and including a plurality of tones within a respective frequency range;

the one or more DMT processing modules are operative to receive from the data link layer processor a respective set of said transmission data for each channel associated with that DMT processing module, and to encode each said set of said transmission data into a respective symbol for transmission on the respective channel; and the one or more DMT processing modules are arranged to receive said sets of transmission data for different respective ones of said channels as interleaved said series of data portions.

3. The system of claim 2, in which the data portions are each respective single bytes of data.

4. The system of claim 2, in which the data link layer processor is an ATM processor.

5. The system of claim 2, in which the data link layer processor is an Ethernet processor.

6. The system of claim 1 in which:

the data link layer processor is arranged, upon receiving transmission data for transmission on one of a transmission channel corresponding to at least one DSL lines, to transmit to a corresponding DMT processing module a series of a polling enquiries, and in response to a positive signal from the corresponding DMT processing module, to transmit to the corresponding DMT processing module a data portion which is a portion of said transmission data; and the one or more DMT processing modules are arranged, upon receipt of said a polling enquiry, to determine whether a predetermined sweep period has elapsed since the corresponding DMT processing module received transmission data from the data link layer processor in respect of that channel, and, to transmit said positive signal to the data link layer processor responsive to a positive determination.

7. The system of claim 6, wherein:

the one or more DMT processing modules are arranged, upon receipt of said a polling enquiry, to determine whether a predetermined delay period has passed since the beginning of a symbol period, and only to transmit a positive response to the data link layer processor if said determination is positive.

8. The system of claim 1, in which the data portions are each respective single bytes of data.

9. The system of claim 1, in which the data link layer processor is an ATM processor.

10. The system of claim 1, in which the data link layer processor is an Ethernet processor.

11. The system of claim 1, wherein the data layer processor is programmable and operable to perform more than one DSL standard protocol.

12. The system of claim 1, wherein the data portions temporally spaced apart from each other reduce an effective burstiness of data traffic.

13. The system of claim 12, wherein the reduced effective burstiness of the data traffic reduces a required size of a buffer in a data link layer platform.

14. The system of claim 1, wherein the system is a line card.

15. A system comprising:

one or more discrete multi-tone (DMT) processing modules for receiving signals transmitted over one or more corresponding DSL lines according to a symbol-based DSL protocol; and a data link layer processor connected to the one or more DMT processing modules for receiving said reception data from the DMT processing modules;

wherein each of the one or more DMT processing modules being arranged to transmit reception data extracted from a single symbol to the data link layer processor as a series of data portions temporally spaced apart from each other by a time interval within a symbol period, the data portions spaced apart from each other by data portions from a different symbol within the symbol period, wherein data portions of one symbol are interleaved in time with data portions from another symbol over the entire symbol period.

16. The system of claim 15, in which:

the one or more DMT processing modules are associated with a respective plurality of receive channels, each receive channel being associated with a respective one of said one or more corresponding DSL lines and including a plurality of tones within a respective frequency range;

the one or more DMT processing modules are operative to transmit, during a symbol period, to the data link layer processor a respective set of reception data for each channel associated with that DMT processing module, each said set of reception data being decoded from a respective symbol on the respective channel; and the one or more DMT processing modules are arranged to transmit said sets of reception data for different respective ones of said channels to said data link layer processor as interleaved said data portions.

17. The system of claim 16, in which the data link layer processor is an ATM processor.

18. The system of claim 16, in which the data link layer processor is an Ethernet processor.

19. The system of claim 15, in which:

the data link layer processor is arranged to transmit, during each symbol period, to the one or more DMT processing modules, a series of a polling enquiries, and, upon transmitting a said polling enquiry to one of said one or more DMT processing modules, is operative to receive a data portion from that DMT processing module; and the one or more DMT processing modules being arranged, upon receipt of a said polling enquiry, and if that DMT processing module is storing reception data obtained from a given channel, to determine whether a predetermined sweep period has elapsed since that DMT processing module transmitted reception data to the data link layer processor in respect of that channel, and to transmit a portion of that reception data to the data link layer processor responsive to a positive determination.

20. The system of claim 19, in which the one or more DMT processing modules are arranged, upon receipt of said a polling enquiry, to determine whether a predetermined delay period has passed since the beginning of a symbol period, and only to transmit said portion of said reception data to the data link layer processor if said determination is positive.

21. The system of claim 15, in which the data portions are each respective single bytes of data.

22. The system of claim 15, in which the data link layer processor is an ATM processor.

23. The system of claim 15, in which the data link layer processor is an Ethernet processor.

24. The system of claim 15, wherein the data portions temporally spaced apart from each other reduce an effective burstiness of data traffic.

25. The system of claim 24, wherein the reduced effective burstiness of the data traffic reduces a required size of a buffer in a data link layer platform.

26. The system of claim 15, wherein the system is a line card.

27. A system comprising:
one or more discrete multi-tone (DMT) processing modules for generating signals according to a symbol-based DSL protocol for transmission on one or more corresponding DSL lines; and
a data link layer processor connected to the one or more DMT processing modules for transmitting data to the DMT processing modules; wherein
each of the one or more DMT processing modules is arranged to receive transmission data from the data link layer processor for encoding a single symbol for a single channel as a series of data portions within a symbol period, and
each portion of the series of data portions is spaced apart in time from all other portions of the series of data portions by data portions from a different symbol within the symbol period, wherein data portions of one symbol are interleaved in time with data portions from another symbol over the entire symbol period.

28. The system of claim 27, wherein each portion of the series of data portions is further spaced apart in time by data portions from a symbol of another channel.

29. The system of claim 27, wherein the system is a line card.

* * * * *